June 10, 1958     S. J. BEGIN     2,838,325
SAFETY JACKKNIFE APPARATUS
Filed Aug. 30, 1956     3 Sheets-Sheet 1
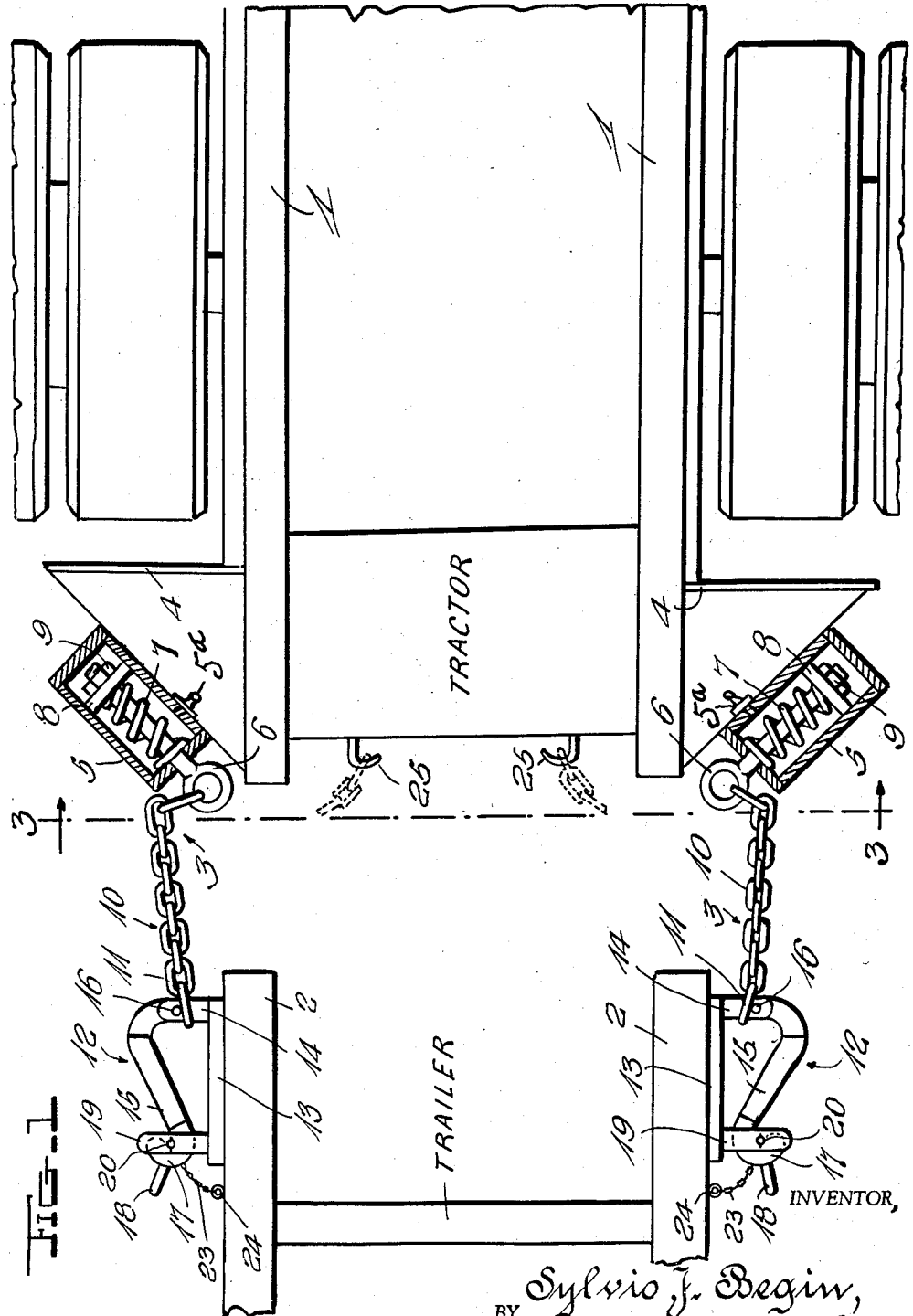
INVENTOR,
Sylvio J. Begin,
BY E. E. Vrooman & Leo.,
ATTORNEYS.

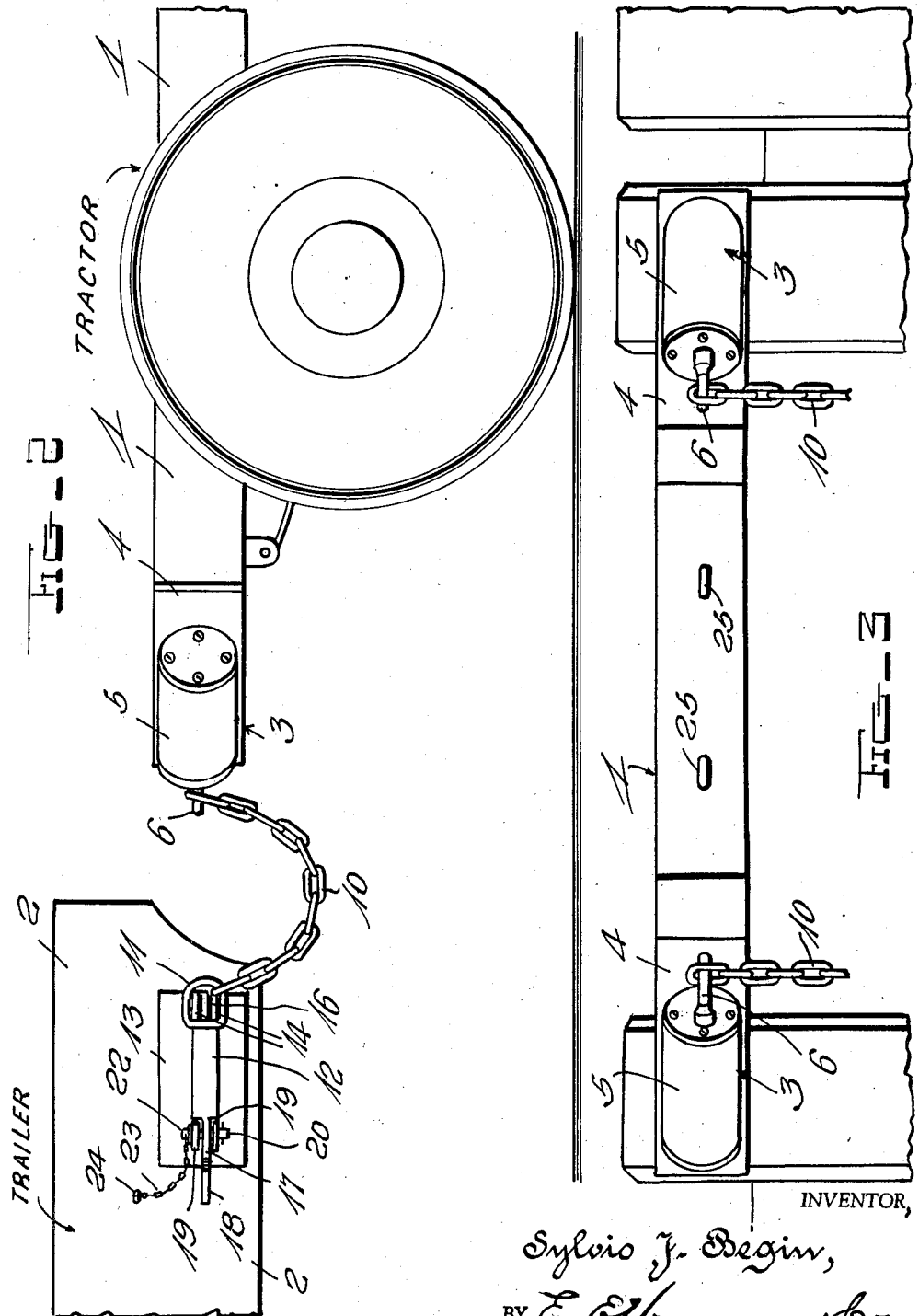

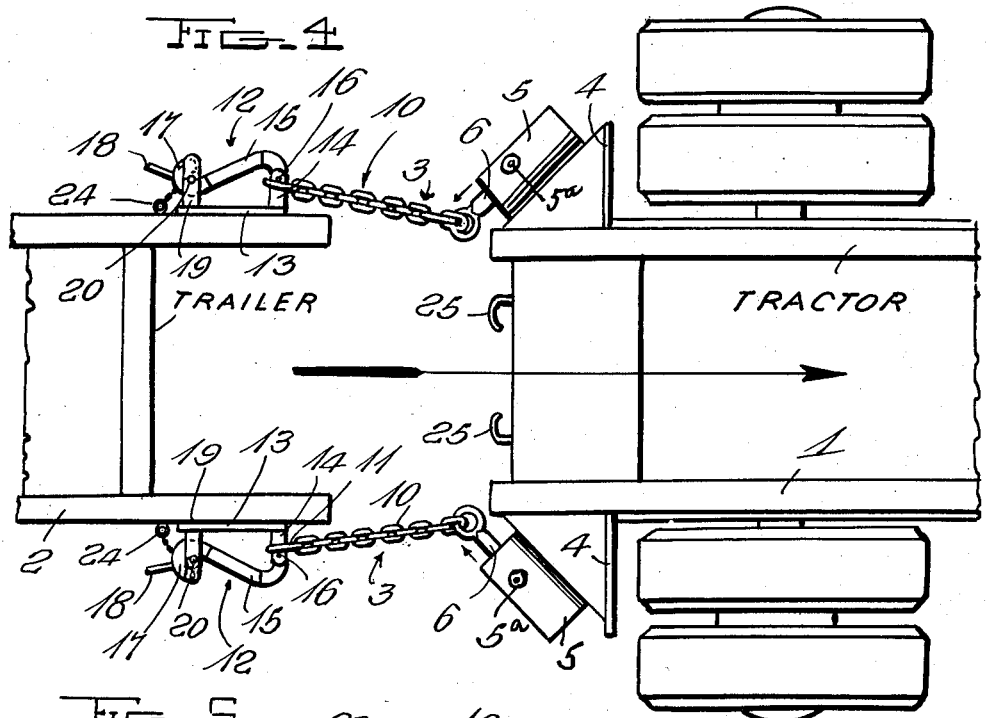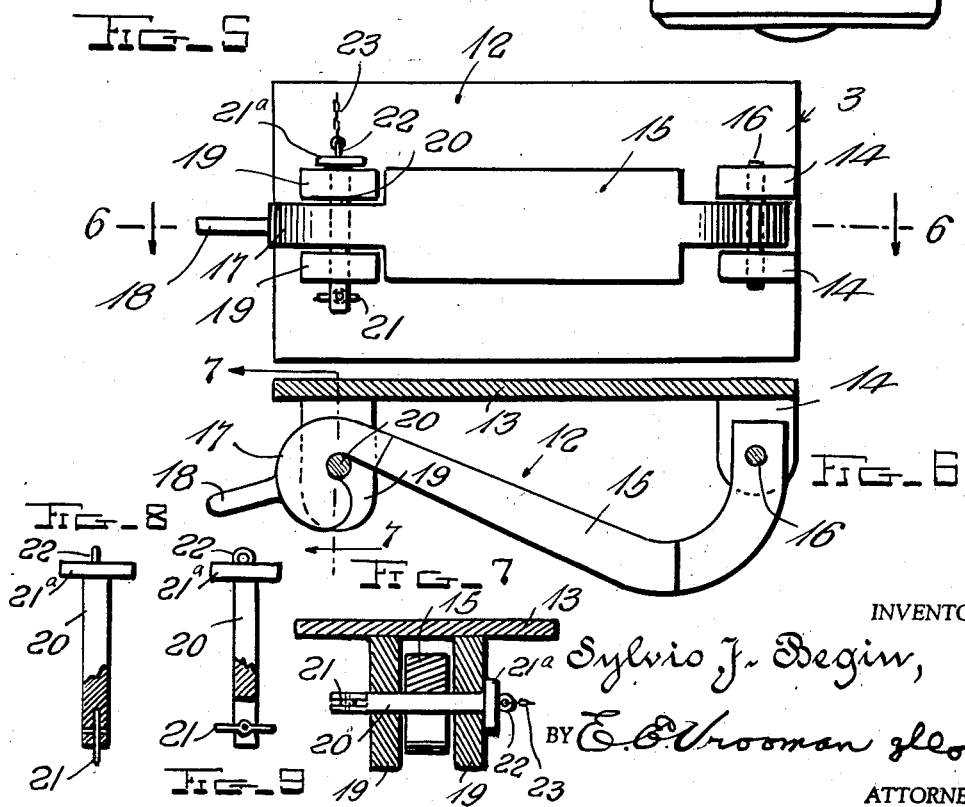

United States Patent Office 2,838,325
Patented June 10, 1958

2,838,325

SAFETY JACKKNIFE APPARATUS

Sylvio J. Begin, Schenectady, N. Y., assignor to K-W Mfg., Inc., Schenectady, N. Y., a corporation of New York Application August 30, 1956, Serial No. 607,091

4 Claims. (Cl. 280—432)

This invention relates to a mechanical safe-sure mechanism to be used by manufacturers, owners, and operators of tractors and trailers.

The object of this invention is to prevent the jackknifing of a tractor and a trailer when assembled, as well as providing added protection in preventing the trailer from breaking away from the tractor.

Another object of the invention is to provide efficient means which will result in safer highway travel, whereby traffic will be comparatively free of accidents.

A further object of the invention is to provide two similary constructed units or devices placed at opposite sides of a tractor and a trailer for efficiently connecting the same together.

A still further object of the invention is to provide novel and efficient means for connecting a tractor to a trailer which comprises a minimum number of elements for accomplishing the desired result.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a top plan view, showing fragmentary views of a tractor and a trailer, having my invention assembled therewith, and showing part of the mechanism in section.

Figure 2 is a view in side elevation, showing fragmentary views of a tractor and a trailer, to which my invention is applied.

Figure 3 is a transverse sectional view taken on line 3—3, Figure 1, and looking in the direction of the arrows.

Figure 4 is a reduced top plan view of the mechanism shown in Figure 1, except that certain parts are not shown in section and a clearer view is provided of the rear wheels of the tractor.

Figure 5 is an enlarged plan view of one of the two latch devices.

Figure 6 is a longitudinal sectional view of the latch device taken on line 6—6, Figure 5, and looking in the direction of the arrows.

Figure 7 is a sectional view taken on line 7—7, Figure 6, and looking in the direction of the arrows.

Figure 8 is a plan view, shown partly in section, of the bolt of the latch device, while Figure 9 is a similar view shown at right angles to Figure 8.

Referring to the drawings by numerals, 1 designates the frame of a tractor, while 2 is the frame of a trailer.

Two similarly constructed devices 3 constitute the essential elements of this invention, and these devices are mounted at opposite sides of the tractor and trailer and therefore, it will only be necessary to specifically describe one.

Each device 3 comprises a triangular spacer 4 which is suitably secured to the frame 1. Mounted on the spacer 4 is a cylinder 5. In this cylinder 5 is slidably mounted an eye-bolt 6 on which is positioned a strong coiled spring 7. On the eye-bolt 6 is also mounted a disc 8 which is against the outer end of said coiled spring 7. A nut 9 is on the outer end of eye-bolt 6 for holding the parts together.

Securely mounted on the eye-bolt 6 is a strong chain 10. One end of chain 10 has its link 11 mounted on the latch device. This latch device 12 comprises a base 13 which is fastened securely to the trailer frame 2. Parallel lugs 14 extend outwardly from the base 13. A latch 15, which is mounted upon pin 16, is carried by said lugs 14. This latch 15 has an outer hooked end 17, with an outer grip 18 formed thereon. On the base 13 is a pair of lugs 19 spaced apart for receiving the outer hooked end 17 of the latch 15. A safety bolt 20 extends through the lugs 19 and is positioned for receiving the outer hooked end of the latch 15 as shown in Figures 5, 6, and 7. The safety bolt 20 has a pivoted latch 21. In placing the safety bolt 20, as shown in Figure 7, the operator pivots latch 21 to parallel position to the longitudinal axis of the bolt 20 and pushes the bolt through the lugs 19, and as soon as the bolt has reached the position in Figure 7, the latch is pivoted to a position at right angles to the longitudinal axis of bolt 20, whereby bolt 20 cannot be accidentally displace from the lugs 19; thus the bolt 20 is automatically locked in position against accidental displacement. The bolt 20 is also provided with an integral washer 21a and an eye 22 at one end. This eye 22 receives part of a safety chain 23 which is fastened at one end 24 to the frame 2 of the trailer, Fig. 2.

When the chains 10 are unhooked from the latch devices 12, they are hooked on the hooks 25; these hooks are fastened to portions of the tractor frame 1.

The Alemite fittings 5a are on tthe cylinders 5.

When a trailer that is attached to a tratcor begins to whip while in action, the devices described immediately proceed to operate. If a tractor sways in one direction beyond the safety point, the device opposite the direction of the sway will absorb the shock of the load and hold the trailer from jackknifing. This is accomplished by the chain tightening up, pulling on the eye-bolt 6, which in turn pulls on the disc 8, causing compression of the high tension spring 7, thereby keeping the trailer from jackknifing and giving the driver sufficient time to gain control of his vehicle.

It is to be understood that the load being carried by the trailer, in addition to the design of the trailer, will determine the size and specification of the springs, eye-bolts, cylinders, chains, triangular spacers and safety-hooks, etc.

While I have described the preferred embodiments of this invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the character described, in combination, a tractor having longitudinally extending frame members, spacers in the form of right angled triangles secured to the outer rear portions of said frame members, with the hypotenuse of the triangles extending outwardly and forwardly, a cylinder secured to the edges of the hypotenuse of each spacer, each cylinder having an opening in its inner rear end, a piston in each cylinder, a piston rod secured to each piston and having one end extending through its associated opening, said one end of each piston rod terminating in an eye, a compression coil spring in each cylinder surrounding a piston rod and normally biasing said piston rod inwardly relative to its associated cylinder, a trailer having longitudinally extending frame members, a base plate carried by the outer front end of each trailer frame member, parallel lugs extending outwardly from the front end of each base plate, a latch arm, a pivot mounting each latch arm between an associated pair of lugs, chains connecting each latch arm to an eye of a piston rod, and means securing each latch arm in chain locking position.

2. In a device of the character described, in combination, a tractor having longitudinally extending frame members, spacers in the form of right angled triangles secured to the outer rear portions of said frame members, with the hypotenuse of the triangles extending outwardly and forwardly, a cylinder secured to the edges of the hypotenuse of each spacer, each cylinder having an opening in its inner rear end, a piston in each cylinder, a piston rod secured to each piston and having one end extending through its associated opening, said one end of each piston rod terminating in an eye, a compression coil spring in each cylinder surrounding a piston rod and normally biasing said piston rod inwardly relative to its associated cylinder, a trailer having longitudinally extending frame members, a base plate carried by the outer front end of each trailer frame member, parallel lugs extending outwardly from the front end of each base plate, a latch arm, a pivot mounting each latch arm between an associated pair of lugs, chains connecting each latch arm to an eye of a piston rod, and means securing each latch arm in chain locking position, said last-mentioned means comprising an outwardly facing hook on the end of each latch arm, a pair of apertured lugs mounted on the rear end of each base plate between which a hook is adapted to seat when in latching positions, and a safety bolt extending through said hook and the apertures in said last mentioned lugs.

3. In a device of the character described, in combination, a tractor having longitudinally extending frame members, spacers in the form of right angled triangles secured to the outer rear portions of said frame members, with the hypotenuse of the triangles extending outwardly and forwardly, a cylinder secured to the edges of the hypotenuse of each spacer, each cylinder having an opening in its inner rear end, a piston in each cylinder, a piston rod secured to each piston and having one end extending through its associated opening, said one end of each piston rod terminating in an eye, a compression coil spring in each cylinder surrounding a piston rod and normally biasing said piston rod inwardly relative to its associated cylinder, a trailer having longitudinally extending frame members, a base plate carried by the outer front end of each trailer frame member, parallel lugs extending outwardly from the front end of each base plate, a latch arm, a pivot mounting each latch arm between an associated pair of lugs, chains connecting each latch arm to an eye of a piston rod, and means securing each latch arm in chain locking position, said last mentioned means comprising an outwardly facing hook on the end of each latch arm, a pair of apertured lugs mounted on the rear end of each base plate between which a hook is adapted to seat when in latching positions, a safety bolt extending through said hook and the apertures in said last mentioned lugs, and a pivoted securing latch carried by said bolt.

4. The structure of claim 3 wherein each chain extends from a latch arm on one side of the trailer to an eye on the same side of the tractor.

References Cited in the file of this patent

UNITED STATES PATENTS

| | | |
|---|---|---|
| 1,479,828 | Morrison | Jan. 8, 1924 |
| 2,134,351 | Arehart | Oct. 25, 1938 |
| 2,592,219 | West et al. | Apr. 8, 1952 |
| 2,689,750 | Van Horn | Sept. 21, 1954 |

FOREIGN PATENTS

| | | |
|---|---|---|
| 1,006,345 | France | Apr. 22, 1952 |